United States Patent [19]

Hanneman et al.

[11] 4,268,586
[45] May 19, 1981

[54] CORROSION RESISTANT ZIRCONIUM ALLOY STRUCTURAL COMPONENTS AND PROCESS

[75] Inventors: Rodney E. Hanneman, Burnt Hills; Andrew W. Urquhart; David A. Vermilyea, both of Scotia, all of N.Y.

[73] Assignee: General Electric Company, Schenectady, N.Y.

[21] Appl. No.: 590,418

[22] Filed: Jun. 26, 1975

[51] Int. Cl.³ .......................................... B32B 15/04
[52] U.S. Cl. .................................. 428/661; 165/133; 176/54; 204/148; 428/660; 428/662; 428/666; 428/670; 428/672; 428/673
[58] Field of Search .............. 29/199, 196, 194, 183.5; 176/68, 8 L, 91 R, 37, 38, 54, 55, 56, 88; 204/148, 192, 43 G, 43 T, 43 N, 46 G, 47, 48, 192 R, 192 C, 192 SP; 138/144, 145, 146; 165/133, 134; 428/660–662, 666, 670, 672, 673

[56] References Cited

U.S. PATENT DOCUMENTS

| | | | |
|---|---|---|---|
| 2,865,832 | 12/1958 | Pitzer | 204/290 F |
| 3,005,706 | 10/1961 | Thomas | 75/177 |
| 3,069,338 | 12/1962 | Schaner | 176/91 R |
| 3,115,702 | 12/1963 | Scutt | 204/290 F |
| 3,150,972 | 9/1964 | Rosler | 75/177 |
| 3,261,682 | 7/1966 | Rosler | 75/177 |
| 3,287,111 | 11/1966 | Klepfer | 176/91 R |
| 3,384,551 | 5/1968 | Kornbichler | 176/54 |
| 3,412,000 | 11/1968 | Bedi | 204/147 |
| 3,844,921 | 10/1974 | Benedict | 204/290 F |

FOREIGN PATENT DOCUMENTS 38-18951 9/1963 Japan ................................ 204/148

OTHER PUBLICATIONS

AEC Contract Report, AT-11-1-GEN-14, Feb., 1973.
Reid, F. H.; "Platinum Metal Plating", *Trans. Inst. Metal Finish,* (G.B.), vol. 48, No. 3, (1970), 115–123.

*Primary Examiner*—L. Dewayne Rutledge
*Assistant Examiner*—Michael L. Lewis
*Attorney, Agent, or Firm*—Leo I. MaLossi; James C. Davis, Jr.

[57] ABSTRACT

Zirconium-base alloy channels, fuel cladding tubes and other components are made resistant to accelerated pustular corrosion in a boiling water reactor environment by coating them with a small amount of a suitable electronically conducting material.

2 Claims, No Drawings

CORROSION RESISTANT ZIRCONIUM ALLOY STRUCTURAL COMPONENTS AND PROCESS

The present invention relates generally to nuclear reactor materials of construction, and is more particularly concerned with a novel method of increasing the resistance of zirconium-base alloys to corrosive attack under typical boiling water reactor operating conditions, and with new structural components produced through the use of that method.

CROSS REFERENCE

This invention is a related to that disclosed and claimed in copending patent application Ser. No. 552,794, filed Feb. 25, 1975, in the names of Cedric D. Williams, Andrew W. Urquhart, James L. Walker, Richard A. Proebstle and Timothy J. Black and assigned to the assignee hereof, which is predicated on the concept of heat treating a zirconium-base alloy body to cause redistribution of the intermetallic particulate phase with resulting substantial increase in resistance to pustular corrosion under boiling water reactor service conditions.

BACKGROUND OF THE INVENTION

Important requirements for materials used in boiling water nuclear reactor construction include low absorption for thermal neutrons, corrosion and stress—corrosion resistance and mechanical strength. Zirconium-base alloys sufficiently satisfy these requirements that they are widely used for such purposes, "Zircaloy-2" (containing about 1.5 per cent tin, 0.15 per cent iron, 0.1 percent chromium, 0.05 per cent nickel and 0.1 per cent oxygen) and "Zircaloy-4" (containing substantially no nickel and about 0.2 per cent iron but otherwise similar to Zircaloy-2) being two of the important commercial alloys commonly finding such use. These alloys, however, are not nearly all that one would desire, particularly in respect to accelerated pustular corrosion which occurs under boiling water reactor normal operating conditions and results in spalling of thick oxides from channels and thickening of oxides on fuel rods. The spalling of oxide flakes leads in some instances to development of high radiation fields in the vicinity of control rod mechanisms where the flakes collect; and the presence of thick oxide layers reduces heat transfer efficiency and can result in local overheating of fuel cladding.

Reports in the prior art of efforts to solve this generally recognized problem do not reveal any real success Thus, in U.S. Pat. No. 3,005,706, it is proposed that from 0.03 to 1.0 per cent of beryllium be added to zirconium alloys intended for use in conventional boilers, boiling water reactors and similar apparatus to enhance corrosion resistance to high-temperature water. Similarly, in U.S. Pat. Nos. 3,261,682 and 3,150,972, cerium and/or yttrium and calcium, respectively, are proposed as zirconium alloy additions in like proportions for the same purpose. Accounts of the long-term results of such compositional changes are sparse, however, and commercial zirconium alloys do not include these additional constituents.

SUMMARY OF THE INVENTION

We have discovered that the ability of zirconium-base alloys to withstand this corrosive attack can be greatly increased through the application of a very small amount of a suitable electronically-conducting material to the surface of the alloy body. Further, we have found that the adherent coating of film thus provided need not be either impervious or continuous and that it can even be in the form of closely-spaced bands or islands running entirely across the surface to be protected. Still further, we have found that metals and materials in general can be effectively used for this purpose even though under conditions of reactor operation they form products such as oxides, so long as those products meet adherence and conductivity requirements.

The foregoing surprising corrosion-resistance properties were discovered through the use of our accelerated corrosion test which provides a good correlation with inreactor performance data. Thus, the test specimens were subjected to high temperature (about 500° C.), high pressure (about 1500 psi) steam in autoclave experiments running from 22 to 24 hours and then visually examined and measured for weight gain.

On the basis of these discoveries, we have hypothesized that the mechanism by which such coatings provide corrosion protection involves promotion of the combination of protons (liberated by the corrosion reaction: $H_2O \rightarrow O^= + 2H_1$) and electrons to produce hydrogen gas which can be harmlessly discharged from the oxide surface. But for that reaction, protons may be absorbed by the oxide with the resulting disruption of the oxide film such as by generation of hydrogen gas bubbles in the oxide or by formation of hydride phase at the oxide-metal interface. Thus, the coatings of this invention may serve to distribute electrons uniformly along the surface of the oxide film, thereby promoting the discharge of protons. Electrons are transported from the metal substrate to the coating through isolated conducting flaws in the oxide film. An alternative explanation involving a catalytic function of the deposited protective coating is possible but appears to be less likely in view of the number of different materials which we have tried successfully for this purpose.

Briefly, in its method aspect this invention involves producing an adherent, thin film coating of electronically-conducting material on the surface of a zirconium-base alloy body to be protected against corrosion. More specifically, the films range from about 50 to about 1,000 Angstroms in thickness and may be either continuous or discontinuous as long as the uncoated areas are not too large.

In its article aspect this invention, in general, consists of a zirconium-base alloy body bearing an adherent, thin film of electronically-conducting material on its surface to be protected under exposure to boiling water reactor operating conditions. In particular, the article is provided with a thin coat of gold, silver, platinum, nickel, chromium, iron, niobium or other conducting material across the entire surface to be protected. Alternatively, the coating may not be continuous; for example, we have found that a coating consisting of a plurality of bands three to nine microns wide spaced about three to nine microns apart provides corrosion protection. A discontinuous coating offers the advantage of reducing the amount of coating material which must be introduced into the reactor environment, thereby minimizing nuclear performance penalties. In the present practice, whether the coating is in the form of separate bands or distributed randomly across the alloy surface, the thickness of the coating will approximate 150 Angstroms.

DETAILED DESCRIPTION OF THE INVENTION

Boiling water reactor structural components such as channels, fuel cladding and fuel rod spacers of zirconium-base alloys are provided in accordance with this invention by a method which includes in addition to the usual forming operations and as a final step a novel and critical coating operation. For this coating purpose one may select from a number of alternative materials and processes including vacuum evaporation, electroless deposition and ion implantation. However, the resulting coating and size of the individual substrate areas exposed through the coating are critical. Thus, the new advantages and results of this invention cannot be consistently obtained unless the films have electronic conductivity under the conditions of use sufficient to perform their protective function. In terms of metals, this means a thickness of at least 50 Angstroms, while conducting oxides and other compounds should be at least 100 Angstroms thick. Substantially greater thicknesses generally do not enhance corrosion protection but add to materials and processing costs and in extreme cases can result in other economic penalties because of parasitic neutron absorption.

To insure a sufficiently uniform distribution of electrons on the oxide surface, the areas which are not directly covered by the conducting material should not exceed about 10 microns in linear dimension; that is, each individual exposed surface portion should not have a transverse dimension greater than about ten microns.

The method and article aspects of this invention are set forth in further detail in the following illustrative, but not limiting, examples of the best practice of this invention:

EXAMPLE I

A test strip of Zircaloy-4 ASTM B352 Grade RA2 of 80-mil gauge thickness was provided with a mask defining eight circular areas about one-quarter inch diameter. Each of these areas was separately exposed to a different metal sputtering source as they were coated with 150-Angstrom films of aluminum, gold, silver, nickel, platinum, chromium, iron and niobium. With the mask removed, the strip was then subjected to 500° C., 1500 psi steam for 24 hours. Visual examination of the test strip on removal from the autoclave at the conclusion of this accelerated corrosion test revealed that except for the aluminum film, substantial corrosion resistance was provided by the very thin metal films. Failure of the aluminum film can be attributed to the formation of a non-conducting oxide under the conditions of the test.

EXAMPLE II

In a test similar to that described in Example I, the entire test specimen was provided with a 150-Angstrom platinum film and subjected to the autoclave test conditions set out above. The weight gain of the specimen was measured as 222 milligrams per square decimeter. Control test specimens bearing no platinum or other protective metal or material film typically gain about 2500 milligrams per square decimeter under such circumstances. Further, it was noted that the weight gain of the coated specimen appeared to have occurred to a substantial extent along the edges of the sample, where the platinum coating quality was suspect.

EXAMPLE III

In another experiment, a test specimen of high purity, crystal bar zirconium was provided with a 1000-Angstrom gold film by conventional sputtering technique. A photoresist mask was then used in selectively removing the gold film to expose the metal surface in a number of closely-spaced (four to 11 microns), narrow (two to nine microns) parallel strips. With the photoresist removed, the specimen was autoclaved with a control specimen, as described in Example I. At the conclusion of this accelerated corrosion test, the control specimen was found to be completely covered with a thick white oxide film, while the coated test specimen had a relatively large area in its central portion which was not substantially attacked by the steam environment. Metallographic examination revealed that the exposed zirconium surfaces between the gold bands had oxide films two to three microns thick which correlates well with the measured 35 to 45 milligrams per square decimeter weight gain expected for any corrosion-resistant zirconium alloy after such exposure. On the reverse side where the gold coating was continuous, and oxide film about one micron thick was observed, indicating that the gold coating was permeable and did not entirely prevent oxidation of the underlying zirconium metal.

Whenever in the present specification and claims reference is made to amounts, ratios, percentages or proportions, the weight basis is meant and intended unless otherwise expressly stated.

What we claim as new and desire to secure by Letters Patent of the United States is:

1. As an article of manufacture, a zirconium-base alloy boiling water reactor structural component having special utility because of its resistance to accelerated pustular corrosion under boiling water reactor conditions, said article having an adherent film coating from about 50 to about 1000 Angstroms thick of a metal selected from the group consisting of gold, silver, platinum, nickel, chromium, iron and niobium and said film comprising a plurality of bands about three to nine microns wide and spaced less than about 10 microns apart.

2. As an article of manufacture, a zirconium-base alloy boiling water reactor structural component having special utility because of its resistance to accelerated pustular corrosion under boiling water reactor conditions, said article having an adherent discontinuous film coating, said film comprising a plurality of bands of gold metal about 150 Angstroms thick.

* * * * *